US010612397B2

(12) United States Patent
Matsuo et al.

(10) Patent No.: US 10,612,397 B2
(45) Date of Patent: Apr. 7, 2020

(54) INSERT ASSEMBLY, AIRFOIL, GAS TURBINE, AND AIRFOIL MANUFACTURING METHOD

(71) Applicant: Mitsubishi Hitachi Power Systems, Ltd., Kanagawa (JP)

(72) Inventors: Saki Matsuo, Yokohama (JP); Satoshi Hada, Yokohama (JP); Keizo Tsukagoshi, Yokohama (JP); Yoshifumi Okajima, Tokyo (JP); Kunihiko Waki, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 84 days.

(21) Appl. No.: 16/069,260

(22) PCT Filed: Jan. 25, 2017

(86) PCT No.: PCT/JP2017/002505
§ 371 (c)(1),
(2) Date: Jul. 11, 2018

(87) PCT Pub. No.: WO2017/145623
PCT Pub. Date: Aug. 31, 2017

(65) Prior Publication Data
US 2019/0010809 A1 Jan. 10, 2019

(30) Foreign Application Priority Data

Feb. 22, 2016 (JP) .................................. 2016-031195

(51) Int. Cl.
*F01D 5/18* (2006.01)
*F01D 25/32* (2006.01)
(Continued)

(52) U.S. Cl.
CPC .............. *F01D 5/189* (2013.01); *F01D 5/18* (2013.01); *F01D 9/02* (2013.01); *F01D 9/065* (2013.01);
(Continued)

(58) Field of Classification Search
CPC ........................... F01D 5/189; F05D 2260/201
See application file for complete search history.

(56) References Cited

U.S. PATENT DOCUMENTS 3,075,744 A * 1/1963 Peterson ................. F01D 5/182
415/115
3,301,527 A 1/1967 Kercher
(Continued)

FOREIGN PATENT DOCUMENTS

EP 1 413 714 4/2004
EP 2 175 103 4/2010
(Continued)

OTHER PUBLICATIONS

International Search Report dated Feb. 28, 2017 in International (PCT) Application No. PCT/JP2017/002505, with English Translation.
(Continued)

*Primary Examiner* — Ninh H. Nguyen
(74) *Attorney, Agent, or Firm* — Wenderoth, Lind & Ponack, L.L.P.

(57) ABSTRACT

An insert assembly (79) includes an insert (80), a reinforcing member (85), and a retaining member (90). The insert (80) is fixed to an end of an airfoil body (51) on one side in a radial direction. The reinforcing member (85) is disposed adjacent to an end of the insert (80) on the other side in the radial direction and enhances the rigidity of the insert (80). The retaining member (90) is fixed to an end of the airfoil body (51) on the other side in the radial direction, and allows the insert (80) to be positioned relative to the airfoil body (51) in a direction orthogonal to the radial direction.

14 Claims, 9 Drawing Sheets

(51) Int. Cl.
*F02C 7/00* (2006.01)
*F02C 7/18* (2006.01)
*F16J 15/16* (2006.01)
*F01D 25/00* (2006.01)
*F01D 11/00* (2006.01)
*F02C 7/28* (2006.01)
*F01D 9/02* (2006.01)
*F01D 9/06* (2006.01)

(52) U.S. Cl.
CPC .............. *F01D 11/00* (2013.01); *F01D 25/00* (2013.01); *F01D 25/32* (2013.01); *F02C 7/00* (2013.01); *F02C 7/18* (2013.01); *F02C 7/28* (2013.01); *F16J 15/16* (2013.01); *F05D 2220/32* (2013.01); *F05D 2230/60* (2013.01); *F05D 2230/642* (2013.01); *F05D 2240/12* (2013.01); *F05D 2240/24* (2013.01); *F05D 2250/75* (2013.01); *F05D 2260/20* (2013.01); *F05D 2260/30* (2013.01); *F05D 2260/607* (2013.01); *F05D 2260/608* (2013.01)

(56) References Cited

U.S. PATENT DOCUMENTS

| | | | |
|---|---|---|---|
| 3,388,888 A * | 6/1968 | Kercher | F01D 5/189 415/115 |
| 3,700,348 A * | 10/1972 | Corsmeier | F01D 5/189 416/90 R |
| 6,398,486 B1 | 6/2002 | Storey et al. | |
| 6,416,275 B1 | 7/2002 | Itzel et al. | |
| 6,453,557 B1 | 9/2002 | Burdgick | |
| 6,561,757 B2 * | 5/2003 | Burdgick | F01D 5/186 415/114 |
| 8,500,405 B1 | 8/2013 | Jones et al. | |
| 2003/0026689 A1 | 2/2003 | Burdgick et al. | |
| 2004/0076520 A1 | 4/2004 | Dellmann et al. | |
| 2004/0109763 A1 * | 6/2004 | Ciacci | F01D 5/14 416/97 R |
| 2006/0140750 A1 | 6/2006 | Burdgick et al. | |

FOREIGN PATENT DOCUMENTS

| | | |
|---|---|---|
| JP | 2001-295604 | 10/2001 |
| JP | 2002-4803 | 1/2002 |
| JP | 2004-144084 | 5/2004 |
| JP | 2005-315264 | 11/2005 |
| JP | 4885275 | 2/2012 |
| JP | 2012-246785 | 12/2012 |
| JP | 5683336 | 3/2015 |

OTHER PUBLICATIONS

Written Opinion of the International Searching Authority dated Feb. 28, 2017 in International (PCT) Application No. PCT/JP2017/002505, with English Translation.

* cited by examiner

INSERT ASSEMBLY, AIRFOIL, GAS TURBINE, AND AIRFOIL MANUFACTURING METHOD

TECHNICAL FIELD

The present invention relates to an insert assembly, an airfoil, a gas turbine, and an airfoil manufacturing method.

The present application claims priority based on Japanese Patent Application No. 2016-031195 filed in Japan on Feb. 22, 2016, the contents of which are incorporated herein by reference.

BACKGROUND ART

Most gas turbines have cooling air circulating, for example, through the inside of airfoils such as stator vanes. Such an airfoil has an airfoil air passage for circulating cooling air through the inside of the airfoil. A cylindrical body like an insert having a large number of holes is disposed inside this airfoil air passage to perform impingement cooling on airfoil walls with cooling air. The cooling air after impingement cooling is discharged into combustion gas through a plurality of cooling holes provided in the airfoil walls, and performs film cooling on the airfoil walls in the process.

This type of cylindrical body undergoes thermal elongation differently from the airfoil body. In such a case, therefore, a first end of two ends of the cylindrical body is fixed to the airfoil body by seal welding or brazing, while a second end is left free relative to elongation of the cylindrical body in a longitudinal direction. This allows the cylindrical body to absorb a difference in thermal elongation while maintaining a sealing effect between the airfoil body and the cylindrical body.

Patent Literature 1 describes a configuration for absorbing a difference in thermal elongation of an insert. According to Patent Literature 1, a free end of the insert is retained by a retaining member so that cooling air does not leak through a gap at the free end.

CITATION LIST

Patent Literature

Patent Literature 1: Japanese Patent Laid-Open No. 2012-246785

SUMMARY OF INVENTION

Technical Problem

However, it cannot be said that the sealing performance of the insert is sufficiently secured in the structure of Patent Literature 1.

An object of the present invention is to provide an insert assembly that can secure stable sealing performance of an insert, an airfoil, a gas turbine, and an airfoil manufacturing method.

Solution to Problem

According to a first aspect of the present invention, an insert assembly is disposed in a turbine airfoil composed of an airfoil body, an outer shroud, and an inner shroud. The outer shroud and the inner shroud are formed respectively at both ends of the airfoil body in a radial direction. The insert assembly is provided inside an airfoil air passage through which cooling air is supplied into the airfoil body. The insert assembly includes an insert, a reinforcing member, and a retaining member. The insert is formed as a cylindrical body having a plurality of cooling holes. The insert is fixed to an end of the airfoil body on one side in the radial direction. The reinforcing member has a plate shape and is provided inside the insert. The reinforcing member extends in a direction orthogonal to the radial direction, and is fixed at both ends to an inner circumferential surface of the cylindrical body. Moreover, the insert is disposed adjacent to an end of the cylindrical body on the other side in the radial direction. The retaining member is fixed to an end of the airfoil body on the other side in the radial direction. The retaining member has an annular shape. The retaining member comes in contact with an end of the insert so as to form a sealing interface on which the insert is slidable in the radial direction. This retaining member allows the insert to be positioned relative to the airfoil body in a direction orthogonal to the radial direction.

When such an insert assembly is provided, the rigidity of the insert is enhanced by the reinforcing plate provided near the other end of the insert in the radial direction. It is therefore possible to suppress an increase in the outside diameter of the end of the insert and prevent a gap from forming at the sealing interface between the insert and the retaining member, so that leakage of cooling air through the sealing interface is suppressed. As a result, air leakage is reduced and stable cooling performance can be secured.

According to a second aspect of the present invention, in the insert assembly according to the first aspect, the sealing interface may be formed on an inner circumferential surface of the end of the insert.

According to a third aspect of the present invention, in the insert assembly according to the first aspect, the sealing interface may be formed on an outer circumferential surface of the end of the insert.

According to a fourth aspect of the present invention, the insert assembly according to any one of the first to third aspects may have an L-sectional shape that is tapered toward the one end of the airfoil body in the radial direction. The insert assembly may include a positioning part, a positioning protrusion, and a flange. The positioning part is formed at a leading end on the side of the one end in the radial direction and has an annular shape. The positioning protrusion is formed adjacent to the positioning part, on the side of the other end in the radial direction, and has a larger diameter than the positioning part. The flange is fixed to the airfoil body. The flange is disposed adjacent to the positioning protrusion, on the side of the other end in the radial direction, and has a larger diameter than the positioning protrusion.

When such an insert assembly is provided, positioning the insert relative to the airfoil air passage is made easier.

According to a fifth aspect of the present invention, the insert assembly according to the fourth aspect may include a positioning part that is fitted in the radial direction on the other end of the insert.

This configuration makes it easier to position the insert relative to the retaining member by means of the positioning part.

According to a sixth aspect of the present invention, the insert assembly according to the fourth aspect may include a positioning protrusion of which a side surface is fitted in an opening of the airfoil air passage on the side of the other end.

This configuration makes it easier to position the retaining member relative to the airfoil air passage by means of the positioning protrusion, and thus also makes it easier to position the insert relative to the airfoil air passage.

According to an aspect of the present invention, the insert assembly may include a reinforcing member that covers the entire area of a passage cross-section of an inner cavity surrounded by the insert.

According to a seventh aspect of the present invention, the insert assembly according to any one of the first to sixth aspects may include a reinforcing member having at least one through-hole.

In this configuration, the reinforcing member has at least one through-hole (vent hole), so that dust in the inner cavity can be moved through the through-hole into a dust housing space to remove dust from the inner cavity. The reinforcing member can also be used as a flow regulating plate that adjusts the flow rate of cooling air supplied to the inner cavity.

According to an eighth aspect of the present invention, the insert assembly according to any one of the first to seventh aspects may include a cover plate that closes an opening provided at the other end of the airfoil body.

In this configuration, fixing the cover plate to the airfoil body can prevent leakage of cooling air from inside the airfoil body.

According to a ninth aspect of the present invention, the insert assembly according to the eighth aspect may include a reinforcing member having a through-hole that is a vent hole through which dust accumulating in a space inside the insert is removed. The insert may have a dust housing space surrounded by the reinforcing member and the cover plate, and the retaining member may be formed so as to be fittable in the insert with the sealing interface therebetween.

In this configuration, the dust housing space is formed between the reinforcing member and the cover plate, and dust can be moved from the space inside the insert into the dust housing space through the vent hole. Since dust can be housed in the dust housing space, the dust can be prevented from clogging a cooling hole of the insert etc.

According to a tenth aspect of the present invention, the insert assembly according to the ninth aspect may include a retaining member to which the cover plate is fixed and which is integrated with the cover plate.

This configuration can reduce the number of components and make maintenance work easier.

According to an eleventh aspect of the present invention, the cover plate according to the ninth aspect may be fixed to the retaining member. The cover plate may be integrated with the retaining member.

According to a twelfth aspect of the present invention, an airfoil includes the insert assembly according to any one of the first to eleventh aspects.

According to a thirteenth aspect of the present invention, a gas turbine includes the airfoil according to the twelfth aspect.

According to a fourteenth aspect of the present invention, an airfoil manufacturing method includes a step of forming an insert that is insertable into an airfoil air passage that is formed so as to extend from an outer shroud to an inner shroud of an airfoil. The airfoil manufacturing method further includes a step of fixing a reinforcing member to an inner circumferential surface of the insert so as to integrate the reinforcing member with the insert. The airfoil manufacturing method further includes a step of forming a retaining member that allows a first end of the insert to be positioned relative to the airfoil air passage. The airfoil manufacturing method further includes a step of fixing a flange of the retaining member to a rim of a first opening of the airfoil air passage. The airfoil manufacturing method further includes a step of inserting the insert into the airfoil air passage through a second opening located on the opposite side from the first opening in which the retaining member is mounted, and positioning the first end of the insert by the retaining member. The airfoil manufacturing method further includes a step of fixing a second end of the insert to a rim of the second opening of the airfoil air passage.

This configuration allows the insert to be disposed at its correct position relative to the airfoil air passage by a simple procedure. As a result, airfoil assembly does not require skillfulness, and burden on assembly workers can be relieved.

According to the fourteenth aspect of the present invention, the gas turbine includes the airfoil according to the twelfth aspect.

Advantageous Effects of Invention

According to the above-described insert assembly, airfoil, gas turbine, and airfoil manufacturing method, the insert assembly can stably maintain excellent sealing performance, so that a decrease in thermal efficiency of the gas turbine can be suppressed. Moreover, the insert assembly can be easily assembled, and stable cooling performance of the airfoil can be secured.

DESCRIPTION OF EMBODIMENTS

First Embodiment

In the following, an insert assembly, an airfoil, a gas turbine, and an airfoil manufacturing method according to a first embodiment of the present invention will be described based on the drawings.

Embodiment of Gas Turbine

Figure 1:
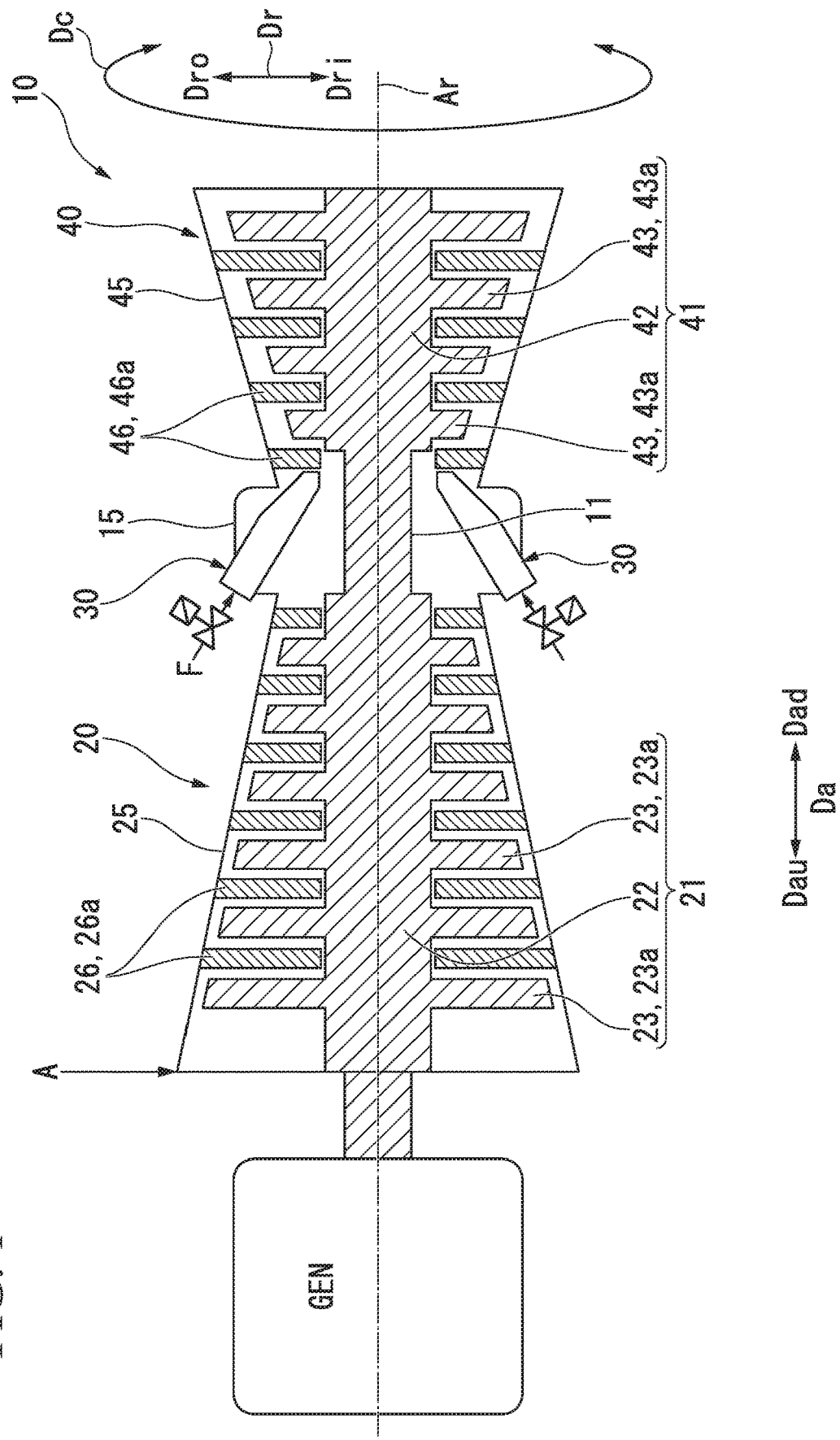
FIG. 1 is a schematic sectional view of a gas turbine in a first embodiment of the present invention.
Figure 2:
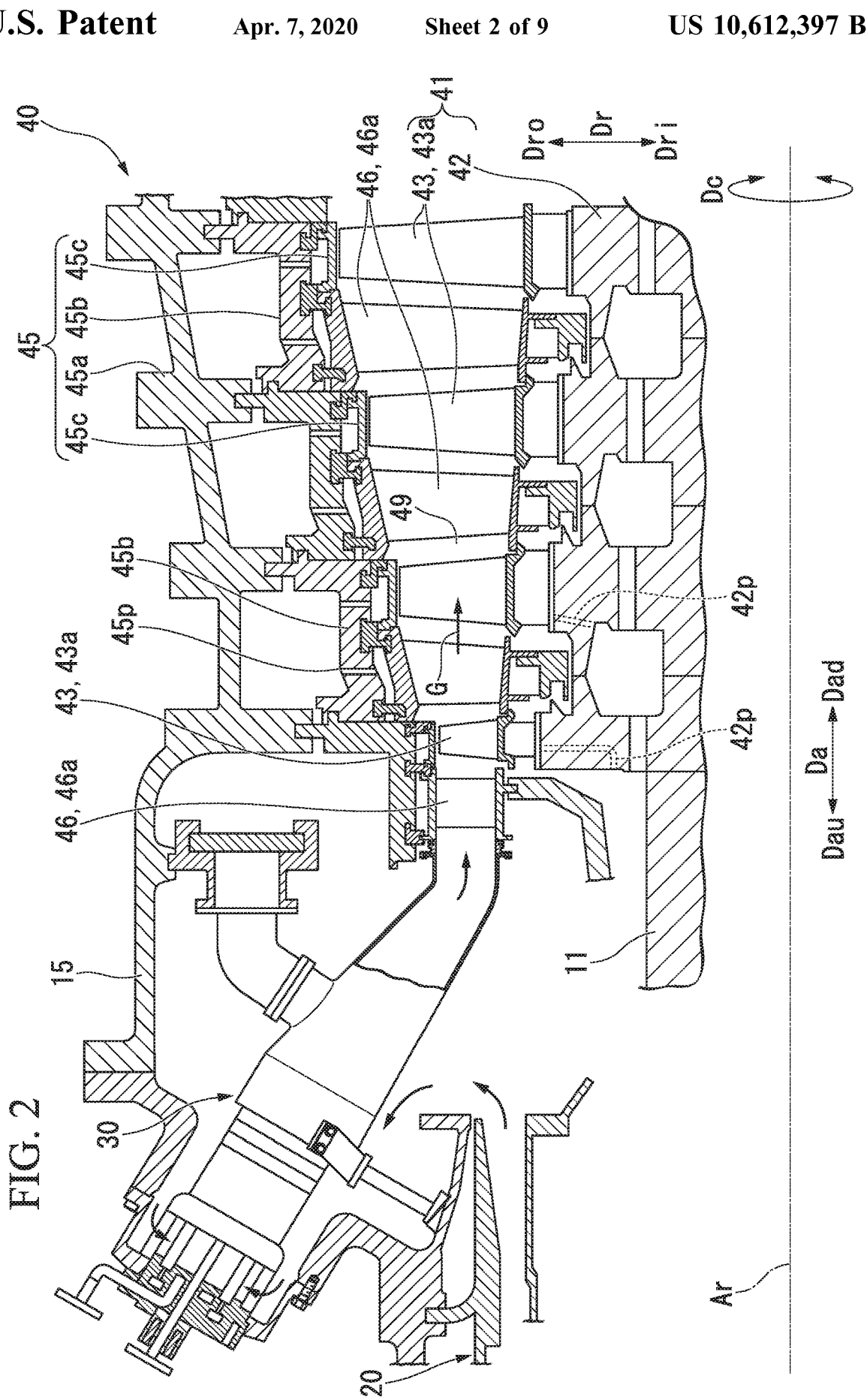
FIG. 2 is a sectional view of main parts of the gas turbine in the first embodiment of the present invention.

FIG. 1 is a schematic sectional view of a gas turbine in the first embodiment of the present invention. FIG. 2 is a sectional view of main parts of the gas turbine in the first embodiment of the present invention.

As shown in FIG. 1, a gas turbine 10 in this embodiment includes a compressor 20, combustors 30, and a turbine 40. The compressor 20 compresses air A. The combustor 30 generates combustion gas by combusting fuel in the air A compressed by the compressor 20. The turbine 40 is driven by the combustion gas.

The compressor 20 has a compressor rotor 21, a compressor casing 25, and a stator vane stage 26. The compressor rotor 21 rotates around an axis Ar. The compressor casing 25 covers the compressor rotor 21. A plurality of stator vane stages 26 is provided.

The turbine 40 includes a turbine rotor 41, a turbine casing 45, and a stator vane stage 46. The turbine rotor 41 rotates around the axis Ar. The turbine casing 45 covers the turbine rotor 41. A plurality of stator vane stages 46 is provided.

The compressor rotor 21 and the turbine rotor 41 are located on the axis Ar. The compressor rotor 21 and the turbine rotor 41 are connected to each other to form a gas turbine rotor 11. For example, the gas turbine rotor 11 is connected to a rotor of a generator GEN.

The compressor casing 25 and the turbine casing 45 are connected to each other to form a gas turbine casing 15.

In the following description of the first embodiment, the direction in which the axis Ar extends will be referred to as an axial direction Da. A circumferential direction around the axis Ar will be referred to simply as a circumferential direction Dc, and a direction perpendicular to the axis Ar will be referred to as a radial direction Dr. In the axial direction Da, the side of the compressor 20 with respect to the turbine 40 will be referred to as an upstream side Dau, and the opposite side will be referred to as a downstream side Dad. In the radial direction Dr, the side closer to the axis Ar will be referred to as a radially inner side Dri, and the opposite side will be referred to as a radially outer side Dro.

The compressor rotor 21 includes a rotor shaft 22 and a plurality of rotor blade stages 23. The rotor shaft 22 extends in the axial direction Da around the axis Ar. The rotor blade stages 23 are arrayed in the axial direction Da and each mounted on the rotor shaft 22. Each rotor blade stage 23 includes a plurality of rotor blades 23a. In the rotor blade stage 23, these rotor blades 23a are arrayed in the circumferential direction Dc. One stator vane stage 26 is disposed on the downstream side Dad of each rotor blade stage 23. The stator vane stages 26 are provided on the inner side of the compressor casing 25. Each stator vane stage 26 includes a plurality of stator vanes 26a. In the stator vane stage 26, these stator vanes 26a are arrayed in the circumferential direction Dc.

As shown in FIG. 2, the turbine rotor 41 includes a rotor shaft 42 and a plurality of rotor blade stages 43. The rotor shaft 42 extends in the axial direction Da around the axis Ar. The rotor blade stages 43 are mounted on the rotor shaft 42.

The rotor blade stages 43 are arrayed in the axial direction Da. Each rotor blade stage 43 is composed of a plurality of rotor blades 43a. The rotor blades 43a are arrayed in the circumferential direction Dc. One stator vane stage 46 is disposed on the upstream side Dau of each rotor blade stage 43. The stator vane stages 46 are provided on the inner side of the turbine casing 45. Each stator vane stage 46 includes a plurality of stator vanes 46a. The stator vanes 46a are arrayed in the circumferential direction Dc.

The turbine casing 45 includes an outer casing 45a, an inner casing 45b, and a plurality of ring segments 45c. The outer casing 45a has a cylindrical shape. The inner casing 45b is fixed on the inner side of the outer casing 45a. The ring segments 45c are fixed on the inner side of the inner casing 45b. The ring segments 45c are each provided between the adjacent stator vane stages 46. One rotor blade stage 43 is disposed on the radially inner side Dri of these ring segments 45c.

A space between the rotor shaft 42 and the turbine casing 45 forms a combustion gas flow passage 49 through which combustion gas G from the combustor 30 flows. The stator vanes 46a and the rotor blades 43a are disposed in the combustion gas flow passage 49. The combustion gas flow passage 49 has an annular shape that is centered at the axis Ar and long in the axial direction Da.

The inner casing 45b of the turbine casing 45 includes cooling air passages 45p that extend through the inner casing 45b from the radially outer side Dro to the radially inner side Dri. Cooling air having passed through the cooling air passage 45p is introduced into the stator vane 46a and the ring segment 45c and used to cool the stator vane 46a and the ring segment 45c. In some cases, air inside the gas turbine casing 15 is supplied as cooling air, without passing through the cooling air passage of the casing, to the stator vanes 46a of some of the stator vane stages 46.

Embodiment of Airfoil

Next, an airfoil in the first embodiment of the present invention will be described based on the drawings. The airfoil in this embodiment is a stator vane of a gas turbine.

Figure 3:
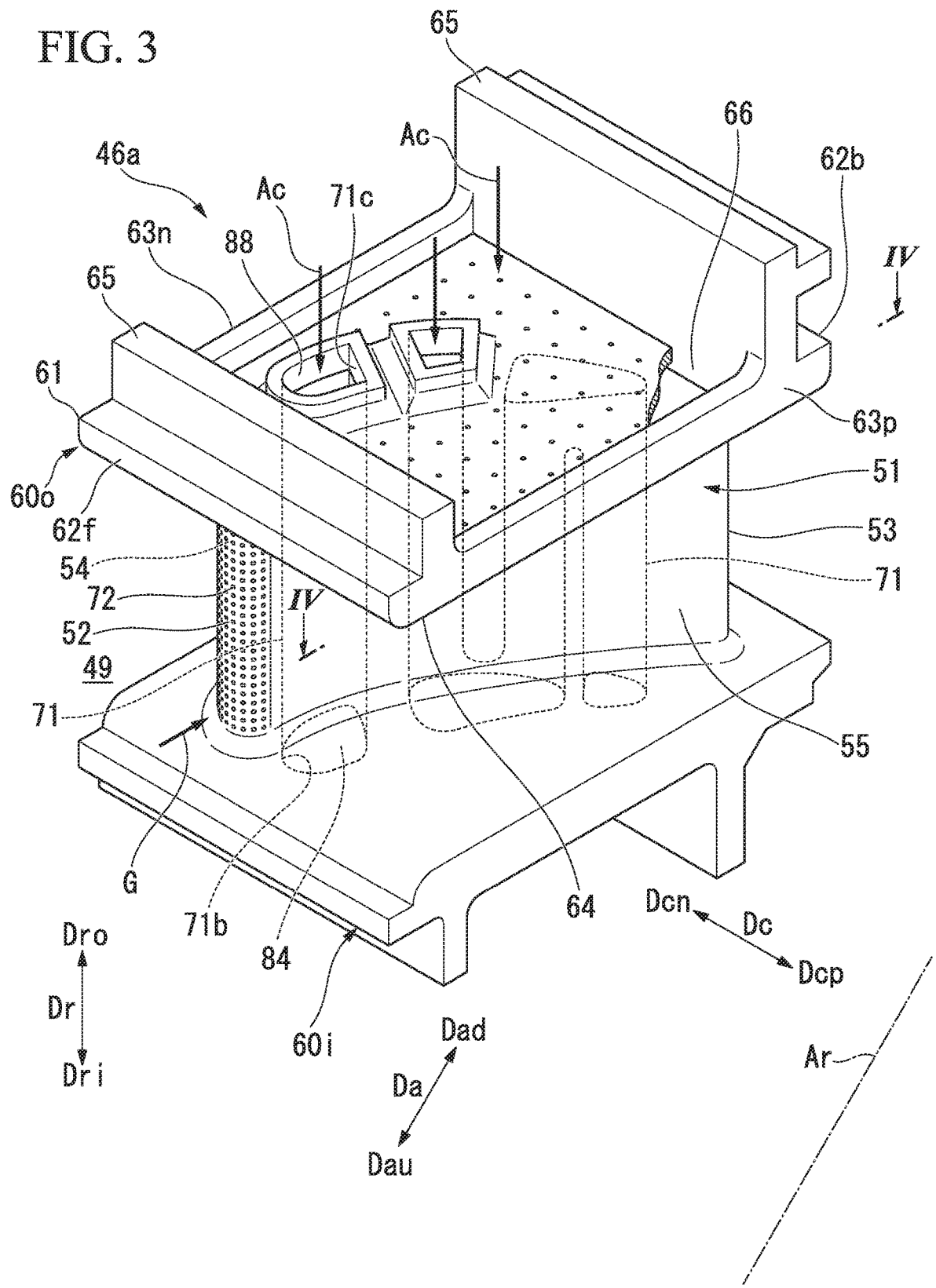
FIG. 3 is a perspective view of a stator vane in the first embodiment of the present invention.

FIG. 3 is a perspective view of the stator vane in the first embodiment of the present invention.

As shown in FIG. 3, the stator vane 46a includes an airfoil body 51, an inner shroud 60i, and an outer shroud 60o. The airfoil body 51 extends in the radial direction Dr.

The inner shroud 60i is formed on the radially inner side Dri of the airfoil body 51. The outer shroud 60o is formed on the radially outer side Dro of the airfoil body 51.

The airfoil body 51 is disposed inside the combustion gas flow passage 49 (see FIG. 2). The combustion gas G passes through the combustion gas flow passage 49.

An end of the airfoil body 51 on the upstream side Dau constitutes a leading edge 52. An end of the airfoil body 51 on the downstream side Dad constitutes a trailing edge 53. Of the airfoil body 51, one of surfaces (outer surfaces) facing the circumferential direction Dc is a convex surface, while the other surface is a concave surface. The convex surface constitutes a suction-side surface 54 (=negative pressure surface), while the concave surface constitutes a pressure-side surface 55 (=positive pressure surface).

In the following description, for the convenience of description, a pressure side (=positive pressure surface side) of the airfoil body 51 in the circumferential direction Dc will be referred to as a circumferential pressure side Dcp, and a suction side (=negative pressure surface side) of the airfoil body 51 will be referred to as a circumferential suction side Dcn.

The outer shroud 60o has an outer shroud body 61 and a peripheral wall 65. The outer shroud body 61 has a plate shape spreading in the axial direction Da and the circumferential direction Dc. The peripheral wall 65 extends along an outer peripheral edge of the outer shroud body 61, and protrudes from the outer shroud body 61 toward the radially outer side Dro.

The outer shroud body 61 includes a front end surface 62f, a back end surface 62b, a pressure-side end surface 63p, a suction-side end surface 63n, and a gas path surface 64. The front end surface 62f is an end surface on the upstream side Dau. The back end surface 62b is an end surface on the downstream side Dad. The pressure-side end surface 63p is an end surface on the circumferential pressure side Dcp. The suction-side end surface 63n is an end surface on the circumferential suction side Dcn. The gas path surface 64 faces the radially inner side Dri.

A recess 66 recessed toward the radially inner side Dri is formed in the outer shroud 60o. The recess 66 is formed by the outer shroud body 61 and the peripheral wall 65.

Here, the outer shroud 60o described above and the inner shroud 60i have basically the same structure. Therefore, detailed description of the inner shroud 60i will be omitted.

A plurality of airfoil air passages 71 (cavities) extending in the radial direction Dr is formed inside the airfoil body 51, the outer shroud 60o, and the inner shroud 60i. Each airfoil air passage 71 is formed continuously from the outer shroud 60o through the airfoil body 51 to the inner shroud 60i. The airfoil air passages 71 are arrayed along the chord of the airfoil body 51. Some of the airfoil air passages 71 that are adjacent to each other communicate with each other at a part on the radially outer side Dro or a part on the radially inner side Dri so as to form a serpentine flow passage.

One of the airfoil air passages 71 is open in the recess 66 of the outer shroud 60o. This one of the airfoil air passages 71 is also open in the recess of the inner shroud 60i. In other words, some of the airfoil air passages 71 are formed so as to extend from the outer shroud 60o to the inner shroud 60i. Part of the cooling air Ac supplied to the radially outer side Dro or the radially inner side Dri of the stator vane 46a flows into this airfoil air passage 71 through an opening of the airfoil air passage 71 (an opening 71b on the side of the inner shroud 60i or an opening 71c on the side of the outer shroud 60o).

The leading edge 52 and the trailing edge 53 of the airfoil body 51 have a plurality of airfoil surface blow-out passages 72 that extends therethrough from the airfoil air passage 71 to the combustion gas flow passage 49. The airfoil body 51 is cooled in the process of the cooling air Ac flowing through the inside of the airfoil air passages 71. The cooling air Ac having flowed into the airfoil air passage 71 flows out through the airfoil surface blow-out passages 72 into the combustion gas flow passage 49. Thus, the leading edge 52 and the trailing edge 53 of the airfoil body 51 are cooled in the process of the cooling air Ac flowing out through the airfoil surface blow-out passages 72. Part of the cooling air Ac having flowed out through the airfoil surface blow-out passages 72 into the combustion gas flow passage 49 serves also as film air by partially covering a surface of the airfoil body 51.

Figure 4:
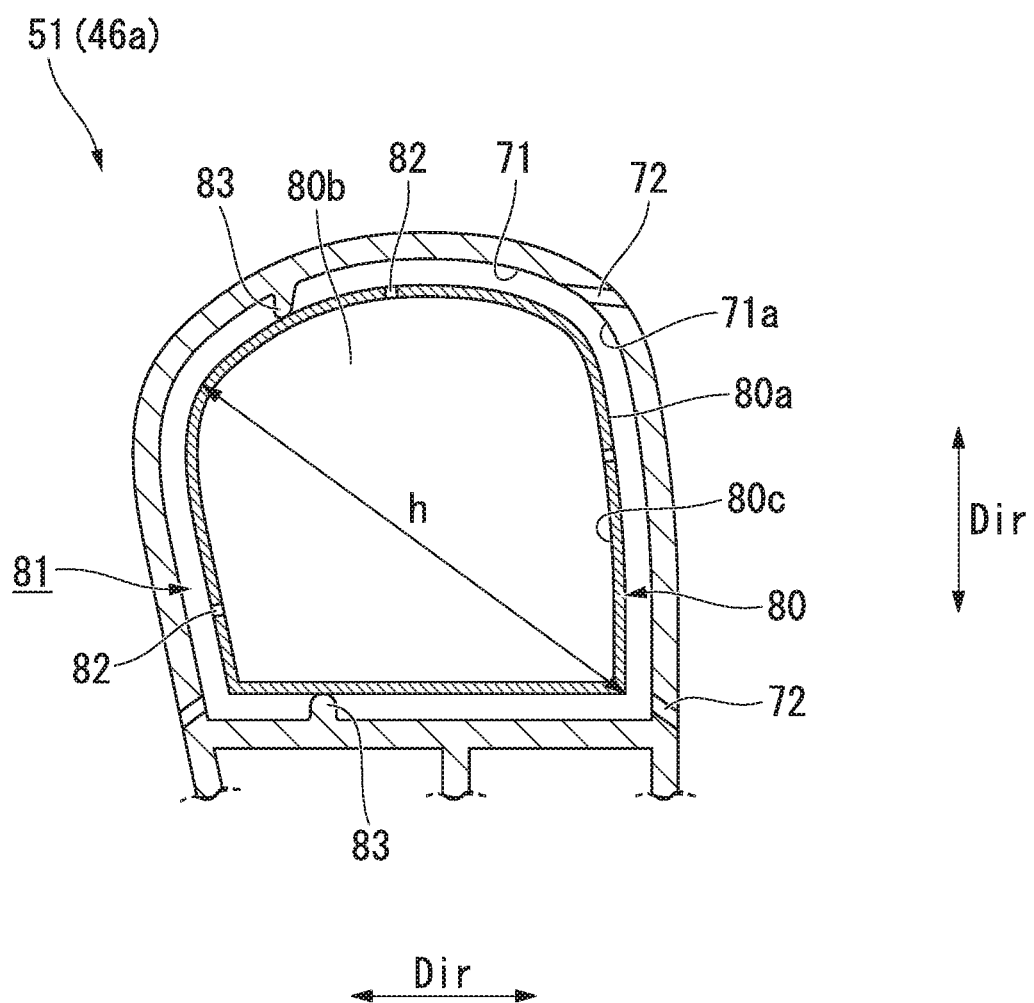
FIG. 4 is a sectional plan view of an airfoil air passage in the first embodiment of the present invention.
Figure 5:
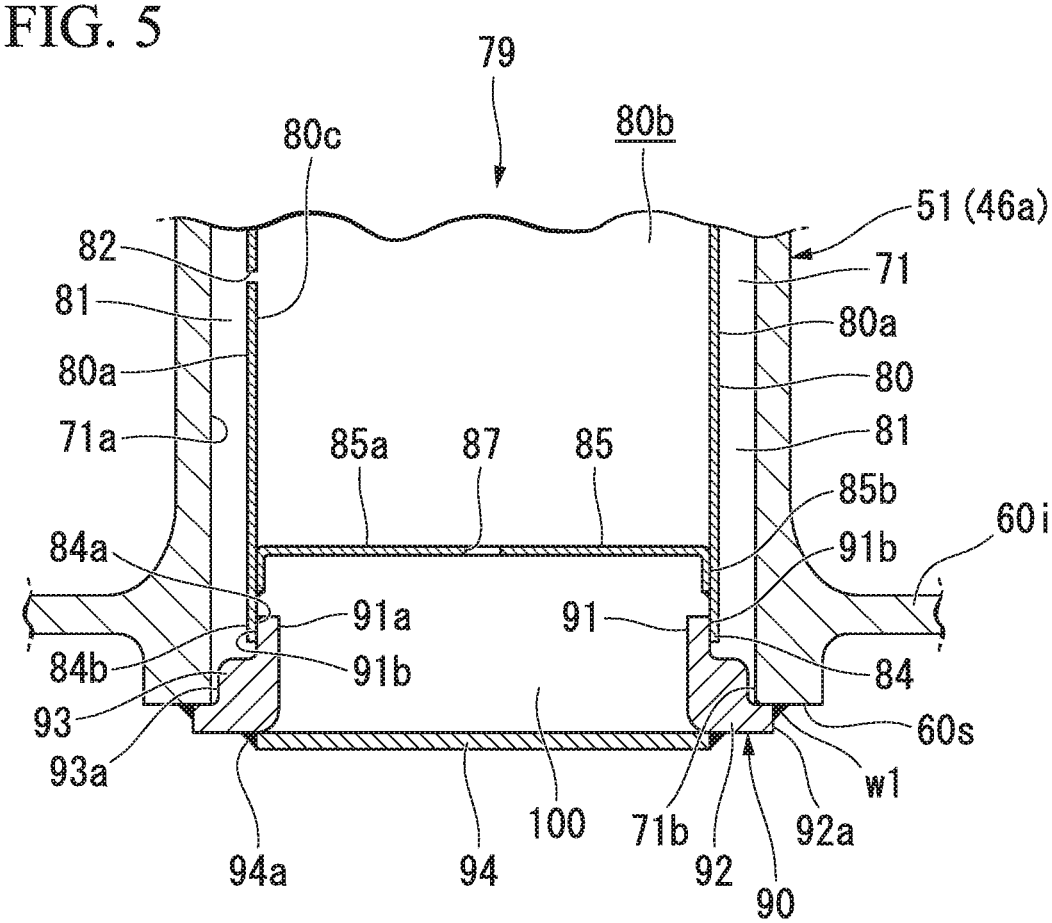
FIG. 5 is a sectional view of a rim of an opening of the airfoil air passage in the first embodiment of the present invention.
Figure 5:
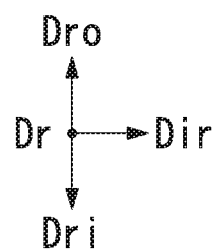

FIG. 4 is a sectional plan view of the airfoil air passage in the first embodiment cut along a plane orthogonal to the radial direction. FIG. 5 is a sectional view of a rim of an opening of the airfoil air passage in the first embodiment.

An insert assembly 79 including an insert 80, a reinforcing member 85, and a retaining member 90 is disposed inside the airfoil air passage 71. The insert 80 is provided to perform impingement cooling on an inner circumferential surface 71a of the airfoil body 51. The reinforcing member 85 enhances the rigidity of the insert 80. The retaining member 90 retains the insert 80 on the airfoil body 51. A direction that is orthogonal to the radial direction Dr and traverses the passage cross-section of the airfoil air passage 71 will be referred to as an insert radial direction Dir.

The insert 80 is a cylindrical body formed by a thin plate. The insert 80 is disposed so that the entire circumference thereof is the same distance away from the inner circumferential surface (inner wall surface) 71a of the airfoil air passage 71. Thus, an insert cavity 81 that is an annular space is formed between the inner circumferential surface 71a of the airfoil body 51 and an outer circumferential surface 80a of the insert 80.

Two seal dams 83 extending in the radial direction Dr are formed on the inner circumferential surface 71a of the airfoil air passage 71. The seal dams 83 have roughly the same length as the insert 80 in the radial direction Dr. The insert cavity 81 is divided by the seal dams 83 into two spaces in a circumferential direction of the insert 80. These two spaces communicate with the combustion gas flow passage 49 through the airfoil surface blow-out passages 72 formed in the airfoil body 51. Therefore, pressures in these two spaces are different from each other due to the influence of the pressure in combustion gas flow passage 49.

The insert 80 has a plurality of impingement holes 82 that provides communication between a space inside the insert 80 (inner cavity 80b) and a space outside the insert 80 (insert cavity 81). Although this is not shown, an outer flange is formed at an end 88 (FIG. 3; a second end or one end) of the insert 80 on the radially outer side Dro, and this outer flange is fixed by welding etc. to an end edge of the airfoil body 51.

An end 84 (a first end or the other end) of the insert 80 on the radially inner side Dri slides on the retaining member 90 while remaining in contact therewith. A sealing interface is formed between the retaining member 90 and the end 84 of the insert 80 (the detailed structure will be described later). The second end refers to the end 88 of the insert 80 at which the insert 80 is fixed to the airfoil body 51, while the first end refers to the end 84 of the insert 80 at which the insert 80 slides on the retaining member 90.

As shown in FIG. 5, the insert 80 further includes the reinforcing member 85. The reinforcing member 85 is formed at a position adjacent to the end 84 of the insert 80 on the radially inner side Dri and separated from the end 84 toward the radially outer side Dro. The reinforcing member 85 has such a plate shape as to close the entire area of the passage cross-section of the insert 80 as seen from the radial direction Dr. End edges of the reinforcing member 85 are bent at a right angle toward the radially inner side Dri from a main body 85a of the reinforcing member 85 to form mount portions 85b. The mount portions 85b are fixed by welding etc. to an inner circumferential surface 80c of the insert 80.

In this embodiment, at least one vent hole 87 that is a through-hole is formed in the main body 85a of the reinforcing member 85. Moreover, in this embodiment, a dust housing space 100 is disposed on the radially inner side Dri from the main body 85a as a border. The dust housing space 100 communicates with the inner cavity 80b through the vent hole 87. The vent hole 87 has a minimum required size that allows passage of only dust contained in the cooling air Ac. Dust contained in the cooling air Ac moves from the inner cavity 80b into the dust housing space 100 through the vent hole 87, and accumulates in the dust housing space 100. The dust accumulating in the dust housing space 100 is removed from the dust housing space 100 during maintenance, for example.

As shown in FIG. 5, the retaining member 90 constituting part of the insert assembly 79 has an annular shape. Moreover, the retaining member 90 has an L-sectional shape when seen from the insert radial direction Dir. The retaining member 90 has a positioning part 91 (first positioning part). The positioning part 91 is formed at a leading end of the retaining member 90 on the radially outer side Dro. The positioning part 91 has an annular thin plate shape.

The retaining member 90 includes a plate-shaped flange 92 at an end on the radially inner side Dri. A side surface 92a of the flange 92 in the insert radial direction Dir is disposed farther on the outer side in the insert radial direction Dir than the inner circumferential surface 71a of the airfoil air passage 71. In other words, the flange 92 has a larger diameter than the inner circumferential surface 71a of the airfoil air passage 71.

A positioning protrusion 93 (second positioning part) is disposed between the positioning part 91 and the flange 92. The positioning protrusion 93 protrudes farther outward in the insert radial direction Dir than the outer circumferential surface 80a of the insert 80. In other words, the positioning protrusion 93 has a larger diameter than the outer circumferential surface 80a. Moreover, the positioning protrusion 93 has a smaller diameter in the insert radial direction Dir than the inner circumferential surface 71a of the airfoil air passage 71.

The retaining member 90 is an annular member formed by integrating the positioning part 91, the positioning protrusion 93, and the flange 92. The retaining member 90 is fitted in the opening (first opening) 71b of the airfoil air passage 71 on the radially inner side Dri. Here, outward in the insert radial direction Dir refers to a direction from a centerline of the insert 80 extending in the radial direction Dr toward the inner circumferential surface 71a of the airfoil air passage 71 in the insert radial direction Dir.

The positioning part 91 allows the end 84 of the insert 80 to be positioned in the insert radial direction Dir relative to the inner circumferential surface (inner wall surface) 71a of the airfoil air passage 71. Moreover, the positioning part 91 restrains the end 84 of the insert 80 from moving in the insert radial direction Dir of the airfoil body 51. An outer circumferential surface 91b of the positioning part 91 in this embodiment has a slightly larger diameter than an inner circumferential surface 84a of the end 84. The positioning part 91 has such a cylindrical shape that it can be fitted in contact with the inner circumferential surface 84a of the end 84 of the insert 80. That is, the inner circumferential surface 84a of the end 84 of the insert 80 is in contact with the retaining member 90, without being fixed by welding etc., through the outer circumferential surface 91b of the positioning part 91. Thus, the sealing interface is formed between the outer circumferential surface 91b of the retaining member 90 and the inner circumferential surface 84a of the end 84.

As will be described in detail later, an outer circumferential surface 93a of the positioning protrusion 93 of the retaining member 90 in the insert radial direction Dir is in contact with the inner circumferential surface 71a of the opening 71b of the airfoil body 51. Thus, the outer circumferential surface 93a of the retaining member 90 is positioned relative to the airfoil body 51 in the insert radial direction Dir.

The positioning part 91 of the insert 80 is slidable relative to the end 84 in the radial direction Dr. Therefore, even when a difference in thermal elongation occurs between the insert 80 and the airfoil body 51, no thermal stress is exerted on the insert 80.

A certain clearance may be left between ends of the mount portions 85b of the reinforcing member 85 on the radially inner side Dri and a leading end of the positioning part 91. When such a clearance is left, the insert 80 undergoing thermal elongation in the radial direction Dr will not interfere with the leading end of the positioning part 91 facing the radially outer side Dro. In this case, the mount portions 85b can be disposed adjacent to the end 84 and be fixed to the inner circumferential surface 84a of the end 84 so as to keep a certain clearance from the positioning part 91. This certain clearance is large enough if a difference in thermal elongation of the insert 80 in the radial direction Dr can absorbed.

Here, for example, the outside diameter of the insert 80 is a width dimension h that is largest in the cross-section of the insert 80 shown in FIG. 4.

The flange 92 is fixed to the rim of the opening 71b of the airfoil air passage 71, for example, through a welded joint formed by fillet welding etc. The flange 92 in this embodiment is fixed to the rim of the opening 71b through a welded joint w1 formed by fillet welding at a corner between the side surface 92a and the end edge of the airfoil body 51. The welded joint w1 is formed along the entire circumference of the flange 92. This prevents the cooling air Ac from leaking through a gap between the flange 92 and the airfoil body 51.

The positioning protrusion 93 allows the retaining member 90 to be positioned relative to the airfoil body 51 in the insert radial direction Dir. The positioning protrusion 93 is fitted by loose fitting etc. into the opening 71b of the airfoil air passage 71. This loose-fitting structure allows the retaining member 90 to be positioned in the insert radial direction Dir relative to the airfoil air passage 71 of the airfoil body 51. Thus, the inner circumferential surface 71a of the airfoil air passage 71 and the outer circumferential surface 93b of the positioning protrusion 93 come in contact with each other in the insert radial direction Dir along the entire circumference. As a result, an equal distance is kept along the entire circumference between the outer circumferential surface 80a of the insert 80 positioned by the positioning part 91 and the inner circumferential surface 71a of the airfoil air passage 71.

As described above, the end 84 of the insert 80 on the radially inner side Dri is fitted on the outer circumferential surface 91b of the positioning part 91 of the retaining member 90, while the inner circumferential surface 84a of the end 84 and the outer circumferential surface 91b of the positioning part 91 come in contact with each other and the sealing interface is formed between these contact surfaces.

The effectiveness of the structure of this embodiment in comparison with a structure in which the reinforcing member 85 is not provided near the end 84 of the insert 80 on the radially inner side Dri will be described. In the case where the end 84 of the insert 80 comes in contact with the positioning part 91 so as to form a sealing interface, there are generally two factors that influence the occurrence of a gap at the sealing interface in a structure not including the reinforcing member 85.

The first factor is that the insert 80 deforms so as to expand outward in the insert radial direction Dir under a differential pressure of the cooling air Ac. Specifically, the outer circumferential surface 80a of the insert 80 deforms outward in the insert radial direction Dir due to a difference in pressure between the inner cavity 80b and the insert cavity 81. This is likely to result in a gap occurring at the sealing interface between the inner circumferential surface 84a of the end 84 and the outer circumferential surface 91b of the positioning part 91.

The inner cavity 80b into which the cooling air Ac is supplied from the outer shroud 60o has the highest pressure. The pressure in the insert cavity 81 on the downstream side that communicates with the inner cavity 80b through the impingement holes 82 is lower than the pressure in the inner cavity 80b. Accordingly, the insert 80 deforms outward in the insert radial direction Dir under the differential pressure between the inner cavity 80b and the insert cavity 81. As a result, the width dimension (e.g., the width dimension h) of the insert 80 in the insert radial direction Dir increases. For this reason, a gap is likely to occur at the sealing interface between the inner circumferential surface 84a of the end 84 of the insert 80 and the outer circumferential surface 91b of the positioning part 91 of the retaining member 90. This gap causes an increase in the amount of the cooling air Ac leaking out from the inner cavity 80b to the insert cavity 81 through the sealing interface, which incurs a loss of the cooling air Ac.

The above example is the case where the sealing interface is formed between the inner circumferential surface 84a of the end 84 and the outer circumferential surface 91b of the positioning part 91. In the case where a sealing interface is formed between the outer circumferential surface 84b of the end 84 and the inner circumferential surface 91a of the positioning part 91, a situation in which a gap occurs at the sealing interface is different from that in the above example. In the case of a structure in which a sealing interface is thus formed between the outer circumferential surface 84b of the end 84 and the inner circumferential surface 91a of the positioning part 91, the outer circumferential surface 84b of the end 84 is pressed against the inner circumferential surface 91a of the positioning part 91. This is because the insert 80 is subjected to the differential pressure between the inner cavity 80b and the insert cavity 81 that acts in the direction in which the gap at the sealing interface decreases.

Thus, depending on the position of the sealing interface, the influence of the differential pressure, which is the first factor, is exerted in the direction in which the gap increases or in the direction in which the gap decreases.

The second factor is that a difference in thermal elongation between the insert 80 and the retaining member 90 in the insert radial direction Dir influences a gap at the sealing interface. Specifically, the inner circumferential surface 71a of the airfoil air passage 71 of the airfoil body 51 is subjected to the heat of the combustion gas G and expands outward in the insert radial direction Dir. As a result, the width dimension of the passage cross-section of the airfoil air passage 71 increases. Here, the retaining member 90 is fixed to the airfoil body 51. Therefore, the retaining member 90 tends to expand outward in the insert radial direction Dir as with the airfoil body 51 so as to follow the movement of the airfoil body 51, so that the inside diameter of the retaining member 90 increases.

Since the insert 80 is directly in contact with the cooling air Ac present inside the inner cavity 80b, the insert 80 does not reach so high a temperature as the retaining member 90. Thus, in the case where the sealing interface is formed between the inner circumferential surface 84a of the end 84 and the outer circumferential surface 91b of the positioning part 91, the outer circumferential surface 91b of the positioning part 91 expands outward in the insert radial direction Dir.

The end 84 of the insert 80 has a relatively low temperature compared with the retaining member 90. Accordingly, the extent to which the end 84 of the insert 80 expands outward in the insert radial direction Dir is small In particular, this tendency is more noticeable with the end 84 of the insert 80 that is retained free from the airfoil body 51 than with the end 88 thereof that is fixed to the airfoil body 51.

Thus, at the sealing interface, the outer circumferential surface 91b of the positioning part 91 shifts a larger distance outward in the insert radial direction Dir than the inner circumferential surface 84a of the end 84. As a result, the gap at the sealing interface is reduced by the larger pressing force from the outer circumferential surface 91b to the inner circumferential surface 84a in the insert radial direction Dir.

However, in the case where the sealing interface is formed between the outer circumferential surface 84b of the end 84 and the inner circumferential surface 91a of the positioning part 91, a situation in which a gap occurs at the sealing interface is different from that in the above example. In the case of this structure, the shift of the inner circumferential surface 91a of the positioning part 91 outward in the insert radial direction Dir exceeds the shift of the outer circumferential surface 84b of the end 84 outward in the insert radial direction Dir. Thus, in this case, a gap is likely to occur at the sealing interface.

Of the above two factors, the first factor has more influence on the occurrence of a gap at the sealing interface. In other words, the dimension of a gap caused by the first factor, i.e., a gap resulting from deformation of the insert 80 due to the difference in pressure occurring between the inner cavity 80b and the insert cavity 81, is larger than the dimension of a gap caused by the second factor, i.e., a gap resulting from a shift at the sealing interface due to the difference in thermal elongation occurring between the insert 80 and the retaining member 90.

The effectiveness of the reinforcing member 85 varies according to whether the sealing interface is located on the side of the inner circumferential surface 84a or the side of the outer circumferential surface 84b of the end 84. The relationship between the factors contributing to the occurrence of a gap at the sealing interface and the effectiveness of the reinforcing member 85 in each different embodiment will be described in that embodiment.

In the case of this embodiment, the inner circumferential surface 84a of the end 84 and the outer circumferential surface 91b of the positioning part 91 come in contact with each other, and a sealing interface is formed therebetween.

In such a structure, as described above, the difference in pressure between the inner cavity 80b and the insert cavity 81 acts in the direction in which the gap at the sealing interface increases. In such a structure, moreover, the difference in thermal elongation between the insert 80 and the retaining member 90 acts in the direction in which the gap at the sealing interface decreases. However, the increase in the gap due to the difference in pressure exceeds the decrease in the gap due to the difference in thermal elongation as described above, so that the gap as a whole tends to increase at the sealing interface.

In this embodiment, therefore, the structure is adopted in which the reinforcing member 85 is provided near the end 84 of the insert 80, for example, adjacently to and on the radially outer side Dro of the end 84. This structure enhances the rigidity of the insert 80 near the end 84 on the radially inner side Dri, and thus suppresses deformation of the insert 80.

Thus, the reinforcing member 85 mounted at a position adjacent to the end 84 of the insert 80 and separated from the end 84 toward the radially outer side has an effect of preventing the insert 80 from expanding outward in the insert radial direction Dir, so as to suppress the occurrence of a gap at the sealing interface and thereby reduce the loss of the cooling air Ac.

A cover plate 94 that closes the entire area of the passage cross-section of the airfoil air passage 71 is disposed over the opening 71b of the airfoil air passage 71 on the radially inner side Dri. The entire circumference of the cover plate 94 is fixed by welding etc. to the flange 92 of the retaining member 90. The cover plate 94 may be fixed by welding etc. to an end of the airfoil body 51 on the radially inner side Dri. In this embodiment, for the cooling air Ac supplied to the airfoil air passage 71, a one-sided supply method of supplying the cooling air Ac to the inner cavity 80b through only the opening 71c of the airfoil air passage 71 (on the side of the outer shroud 60o) is adopted. Therefore, the cover plate 94 is provided to close the opening 71b of the airfoil body 51. An example of a double-sided supply method of the cooling air Ac as another embodiment will be described later.

Fixing the cover plate 94 by welding etc. to the flange 92 can enhance the rigidity of the retaining member 90. With the cover plate 94 thus provided, the cooling air Ac will not flow through the opening 71b of the airfoil air passage 71 into the airfoil air passage 71. Moreover, with the cover plate 94 thus provided, the cooling air Ac inside the inner cavity 80b will not leak from the airfoil body 51 to the outside. Since the end 84 of the insert 80 and the positioning part 91 of the retaining member 90 come in contact with each other and the end 84 of the insert 80 slides in the radial direction Dr, this structure can absorb thermal elongation of the insert 80 in the radial direction Dr of the insert.

Next, the flow of the cooling air Ac will be described. The cooling air Ac supplied from the cooling air passage 45p etc. to the outer shroud 60o flows into the inner cavity 80b of the insert 80 through the opening (second opening) 71c of the airfoil air passage 71 on the radially outer side Dro. The cooling air Ac supplied to the inner cavity 80b blows out to the insert cavity 81 through the large number of impingement holes 82 formed in the wall of the insert 80. The cooling air Ac having blown out through the impingement holes 82 to the insert cavity 81 performs impingement cooling on the inner circumferential surface 71a of the airfoil body 51, and is discharged through the airfoil surface blow-out passages 72 into the combustion gas flow passage 49. The airfoil surface is film-cooled in the process of the cooling air Ac being discharged through the airfoil surface blow-out passages 72. Part of the cooling air Ac flows into the dust housing space 100 through the vent hole 87 of the reinforcing member 85 disposed on the radially inner side Dri inside the insert 80.

Of part of the cooling air Ac having flowed into the dust housing space 100, a slight amount of the cooling air Ac leaks out to the insert cavity 81 through the sealing interface (contact interface) formed between the end 84 of the insert 80 and the positioning part 91 of the retaining member 90. The cooling air Ac having thus leaked out is finally discharged into the combustion gas flow passage 49.

Therefore, the pressure of the cooling air Ac is highest inside the inner cavity 80b. The pressure in the dust housing space 100 is lower than the pressure in the inner cavity 80b. The pressure in the insert cavity 81 is even lower than the pressure in the dust housing space 100.

Accordingly, part of the cooling air Ac inside the inner cavity 80b flows from the inner cavity 80b into the dust housing space 100. The cooling air Ac inside the dust housing space 100 leaks out to the insert cavity 81 through the sealing interface between the inner circumferential surface 84a of the end 84 and the outer circumferential surface 91b of the positioning part 91 of the retaining member 90. Thus, a flow of the cooling air Ac leaking out from the inner cavity 80b to the insert cavity 81 occurs. As a result, dust present inside the inner cavity 80b near the vent hole 87 moves smoothly through the vent hole 87 into the dust housing space 100, and accumulates at a bottom of the dust housing space 100. Since only a slight amount of the cooling air Ac leaks out to the insert cavity 81 through the sealing interface between the inner circumferential surface 84a of the end 84 and the outer circumferential surface 91b of the positioning part 91 of the retaining member 90, the dust inside the dust housing space 100 is unlikely to be discharged from the dust housing space 100 to the insert cavity 81.

The above-described structure is a structure in which the cooling air Ac is supplied through the opening 71c of the airfoil air passage 71 on the side of the outer shroud 60o. Alternatively, a structure in which the cooling air Ac is supplied through the opening 71b of the airfoil air passage 71 in the inner shroud 60i may be adopted. In this case, the retaining member 90, the cover plate 94, the reinforcing member 85, and the dust housing space 100 are disposed near the opening 71c of the airfoil air passage 71 at the end 88 on the radially outer side Dro. As the names of the ends of the airfoil body 51 in the radial direction, the end on the side where the insert 80 is fixed to the end edge of the airfoil body 51 is sometimes referred to as a second end, and the end on the opposite side in the radial direction is sometimes referred to as a first end. The ends of the airfoil air passage 71 and the insert in the radial direction are sometimes referred to in accordance with those names of the airfoil body.

Airfoil Manufacturing Method

The retaining member, the insert assembly, the airfoil, and the gas turbine of this embodiment have the configurations as described above. Next, a method of manufacturing the airfoil of this embodiment will be described in accordance with the drawings.

Figure 6:
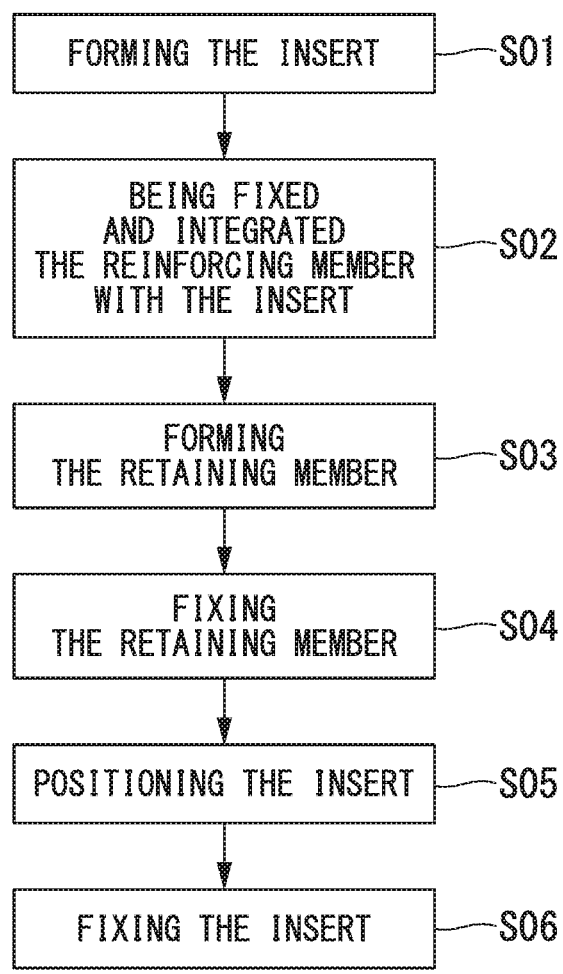
FIG. 6 is a flowchart of an airfoil manufacturing method in the first embodiment of the present invention.

FIG. 6 is a flowchart of an airfoil manufacturing method in an embodiment of the present invention.

First, the insert 80 insertable into the airfoil air passage 71 (cavity) that is formed so as to extend from the outer shroud 60o to the inner shroud 60i of the airfoil body 51 is formed (step S01).

Next, end edges of the main body 85a of the reinforcing member 85 are bent at a right angle toward the radially inner side Dri to form the mount portions 85b.

Next, the mount portions 85b of the reinforcing member 85 are fixed to the inner circumferential surface 84a of the insert 80 on both sides. Specifically, the mount portions 85b of the reinforcing member 85 are fixed by welding etc. Here, the mount portions 85b are fixed to the inner circumferential surface 84a at a position adjacent to and on the radially outer side Dro of the end 84 of the insert 80, which is the inner circumferential surface 84a on both sides of the insert 80 facing each other in the insert radial direction Dir. As the mount portions 85b are thus fixed, the reinforcing member 85 is integrated with the insert 80 (step S02).

Similarly, the retaining member 90 that allows the end 84 of the insert 80 to be positioned relative to the airfoil air passage 71 is formed (step S03).

The order in which the step of forming the insert 80 and the step of forming the retaining member 90 are performed is merely an example, and is not limited to the above order.

Next, the positioning protrusion 93 of the retaining member 90 is fitted into the opening 71b of the airfoil air passage 71, and the flange 92 of the retaining member 90 is fixed by welding etc. to the rim of the opening 71b of the airfoil air passage 71 (step S04).

Thereafter, the insert 80 is inserted into the airfoil air passage 71 through the opening 71c of the airfoil air passage 71 on the radially outer side Dro that is on the opposite side from the opening 71b in which the retaining member 90 is mounted. Moreover, the end 84 of the insert 80 is fitted on the positioning part 91 of the retaining member 90 to position the end 84 of the insert 80 (step S05).

Then, the end 88 of the insert 80 on the radially outer side Dro is fixed by welding etc. to the rim of the opening of the airfoil air passage 71 (step S06).

According to the insert assembly 79 of the above embodiment, the reinforcing member 85 can enhance the rigidity of the insert 80 near the end 84 of the insert 80. Thus, it is possible to suppress leakage of the cooling air Ac to the insert cavity 81 through the sealing interface between the end 84 of the insert 80 and the retaining member 90 that constitute parts of the insert assembly 79. As a result, it is possible to improve the cooling performance of the gas turbine and suppress a decrease in thermal efficiency.

The above-described insert assembly, airfoil, and gas turbine structure can suppress leakage of cooling air from the insert assembly and prevent a decrease in the thermal efficiency of the gas turbine.

Moreover, according to the insert assembly of the above embodiment, the dust housing space 100 can be formed between the reinforcing member 85 and the cover plate 94 (retaining member 90). Furthermore, dust can be moved from the inner cavity 80*b* of the insert 80 into the dust housing space 100 through the vent hole 87 formed in the reinforcing member 85. As a result, dust can be housed in the dust housing space 100, so that the dust can be prevented from clogging the impingement holes 82 of the insert 80 and the reliability can be improved.

In this embodiment, the vent hole 87 is provided in the reinforcing member 85, and the dust housing space 100 is disposed on the radially inner side Dri of the reinforcing member 85 to realize the function of removing dust contained in the cooling air Ac. However, the vent hole may be omitted from the reinforcing member 85. In other words, the reinforcing member 85 may be a member intended only to enhance the rigidity of the insert 80.

Second Embodiment

Figure 7:
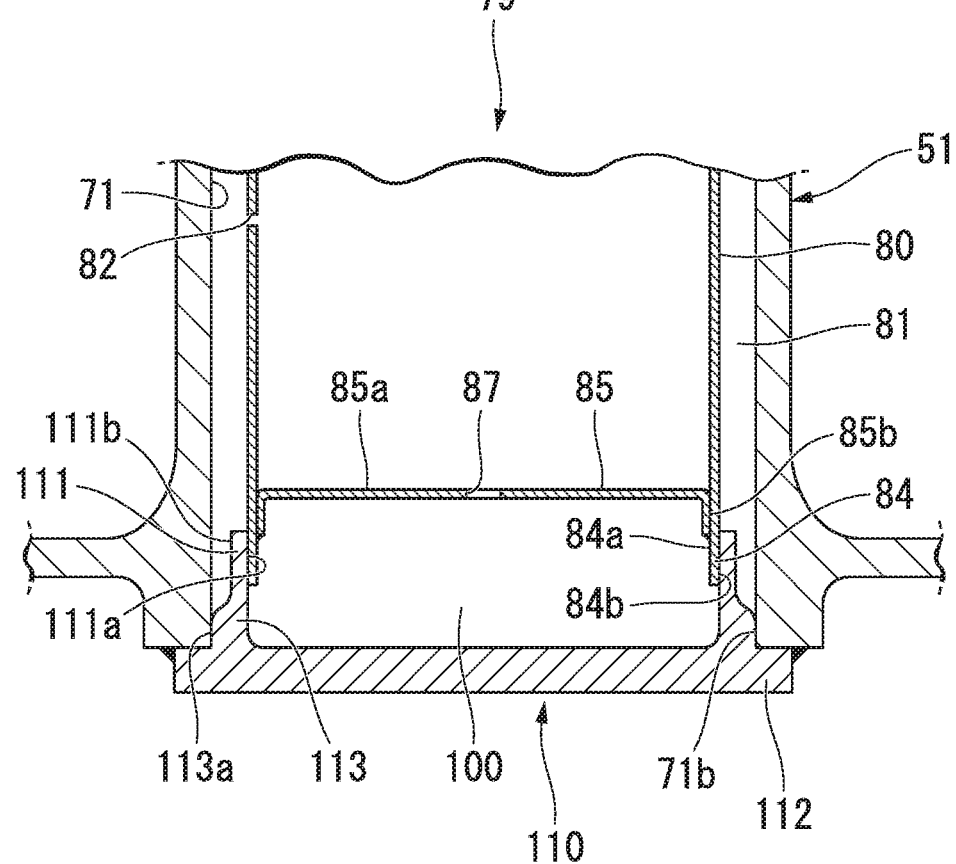
FIG. 7 is a sectional view of a rim of an opening of an airfoil air passage in a second embodiment of the present invention.
Figure 7:
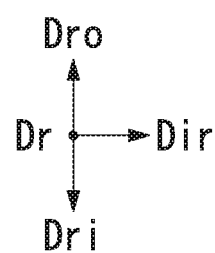

The structure of a second embodiment will be described with reference to FIG. 7.

This embodiment is different from the first embodiment in that the retaining member 90 and the cover plate 94 of the first embodiment are integrated into one retaining member 110. Specifically, the insert assembly 79 of this embodiment is formed by the insert 80 and the retaining member 110. In the second embodiment, a structure for the one-sided supply method of supplying the cooling air Ac through the opening 71*c* of the airfoil air passage 71 in the outer shroud 60*o* will be described as an example.

A plate-shaped flange 112 that closes the opening 71*b* of the airfoil air passage 71 is disposed at the end of the airfoil body 51 on the radially inner side Dri. In the retaining member 110, an annular thin plate-shaped positioning part 111 protruding from the flange 112 toward a leading end on the radially outer side Dro is formed. An inner circumferential surface 111*a* of the positioning part 111 comes in contact with the outer circumferential surface 84*b* of the end 84 of the insert 80 to form a sealing interface.

The first embodiment is the structure in which the outer circumferential surface 91*b* of the positioning part 91 is fitted on the inner side of the inner circumferential surface 84*a* of the end 84 of the insert 80, and the sealing interface at which the end 84 of the insert 80 and the positioning part 91 come in contact with each other is formed on the side of the outer circumferential surface 91*b* of the positioning part 91.

By contrast, the second embodiment is a structure in which the inner circumferential surface 111*a* of the positioning part 111 of the retaining member 110 is fitted on the outer side of the outer circumferential surface 84*b* of the end 84 of the insert 80. Thus, unlike the sealing interface of the first embodiment, the sealing interface at which the end 84 of the insert 80 and the positioning part 111 come in contact with each other in the second embodiment is formed on the side of the inner circumferential surface 111*a* of the positioning part 111. In the second embodiment, too, the difference in thermal elongation between the insert 80 and the airfoil body 51 in the radial direction Dr is absorbed as the end 84 of the insert 80 slides relative to the retaining member 110 in the radial direction Dr at the sealing interface.

A positioning protrusion 113 is formed between the flange 112 and the positioning part 111. The positioning protrusion 113 has a side surface 113*a* protruding in the insert radial direction Dir. In the insert radial direction Dir, the side surface 113*a* of the positioning protrusion 113 has a larger diameter than an outer circumferential surface 111*b* of the positioning part 111, and has a smaller diameter than the inner circumferential surface 71*a* of the airfoil air passage 71. The side surface 113*a* of the positioning protrusion 113 serves to position the retaining member 110 relative to the airfoil body 51 in the insert radial direction Dir when the retaining member 110 is to be fitted in the opening 71*b* of the airfoil air passage 71. The flange 112 is fixed by welding etc. to the airfoil body 51 after being positioned relative to the airfoil body 51 in the insert radial direction Dir.

The other components including the insert 80 are the same as in the first embodiment. Therefore, the same components as in the first embodiment will be denoted by the same name and the same reference sign to omit detailed description thereof. Also in the case where this embodiment is applied to a structure for the one-sided supply method of supplying the cooling air Ac through the opening 71*b* of the airfoil air passage 71 in the inner shroud 60*i*, as in the above-described case of the outer shroud 60*o*, the retaining member 110, the reinforcing member 85, and the dust housing space 100 can be disposed near the opening 71*c* of the airfoil air passage 71 at the end 88 on the radially outer side Dro. The airfoil manufacturing method is also the same as in the first embodiment, and therefore detailed description thereof will be omitted.

This embodiment is a structure in which the outer circumferential surface 84*b* of the end 84 of the insert 80 comes in contact with the inner circumferential surface 111*a* of the positioning part 111 of the retaining member 110. In the case of this embodiment, therefore, the gap at the sealing interface formed between the outer circumferential surface 84*b* of the end 84 and the inner circumferential surface 111*a* of the positioning part 111 decreases due to the difference in pressure between the inner cavity 80*b* and the insert cavity 81. The gap at the sealing interface formed between the outer circumferential surface 84*b* of the end 84 and the inner circumferential surface 111*a* of the positioning part 111 increases due to the difference in thermal elongation between the insert 80 and the retaining member 110.

However, the gap at the sealing interface decreases as a whole, since the factor of the difference in pressure has more influence on the occurrence of a gap at the sealing interface than the factor of the difference in thermal elongation as described above.

In the case of the structure of the second embodiment, the sealing effect at the sealing interface may be not sufficiently secured unless the reinforcing member 85 is provided near the end 84. Specifically, when the reinforcing member 85 is not provided, the insert 80 deforms so as to expand outward in the insert radial direction Dir due to the difference in pressure. However, a part of the insert 80 near the end 84 is restrained from expanding in the insert radial direction Dir by the inner circumferential surface 111*a* of the positioning part 111. In other words, a part of the insert 80 extending toward the radially outer side Dro beyond a leading end of the positioning part 111 in the radial direction Dr expands outward in the insert radial direction Dir without being restrained by the positioning part 111.

Therefore, with end edge of the inner circumferential surface 111a of the positioning part 111 on the radially outer side Dro serving as a contact point, the part of the end 84 of the insert 80 farther on the radially outer side Dro than this contact point deforms outward in the insert radial direction Dir. The part of the insert 80 farther on the radially inner side Dri than the contact point deforms inward in the insert radial direction Dir.

Thus, the outer circumferential surface 84b of the end 84 and the inner circumferential surface 111a of the positioning part 111 are not in surface contact with each other at the sealing interface. The end edge of the inner circumferential surface 111a of the positioning part 111 on the radially outer side Dro and the outer circumferential surface 84b of the end 84 come in contact with each other in the form of line contact. Since the sealing effect cannot be sufficiently secured in this line contact state, it is important to provide the reinforcing member 85 near the end 84 so as to enhance the rigidity of the insert 80 near the end 84 and secure the sealing effect. In this embodiment, too, the reinforcing member is effective in preventing deformation of the insert near the end 84 as described above.

The structure in which a sealing interface is formed on the outer circumferential surface 834b of the end 84 can also be adopted in the first embodiment. In this case, too, it is effective to provide the reinforcing member 85 near the end 84 as in the second embodiment.

The reinforcing member 85 in the second embodiment may be a member that is not provided with a vent hole and intended only to enhance the rigidity of the insert 80.

Third Embodiment

The structure of a third embodiment will be described with reference to FIG. 8.

Unlike the first embodiment and the second embodiment, the third embodiment is applied to an airfoil structure in which the cover plate is not provided over the opening of the airfoil air passage 71, and which is for the double-sided supply method of introducing the cooling air Ac through the openings of the airfoil air passage 71 on both sides. Specifically, the insert assembly 79 of the third embodiment is composed of the insert 80, the reinforcing member 85, and the retaining member 90. In the first embodiment and the second embodiment, the cooling air Ac is supplied to the inner cavity 80b through only the opening 71c of the airfoil air passage 71 in the outer shroud 60o. The third embodiment is a structure that allows the cooling air Ac to be supplied to the inner cavity 80b through the openings 71b, 71c of the airfoil air passage 71 on both sides in the outer shroud 60o and the inner shroud 60i. The third embodiment is the same as the other embodiments in that the reinforcing member 85 is provided near the end 84 of the insert 80 on the radially inner side Dri, for example, adjacently to and on the radially outer side Dro of the end 84. However, the structure of this reinforcing member 85 is different from that in the other embodiments in that the reinforcing member 85 functions as a flow regulating plate that adjusts the flow rate of the cooling air Ac. A large number of vent holes 87 (through-holes) are formed in the main body 85a of the reinforcing member 85. It is possible to adjust the flow rate of the cooling air Ac flowing in through the vent holes 87 by varying the number or the hole diameter of the vent holes 87 in the main body 85a formed as a porous plate.

Figure 8:
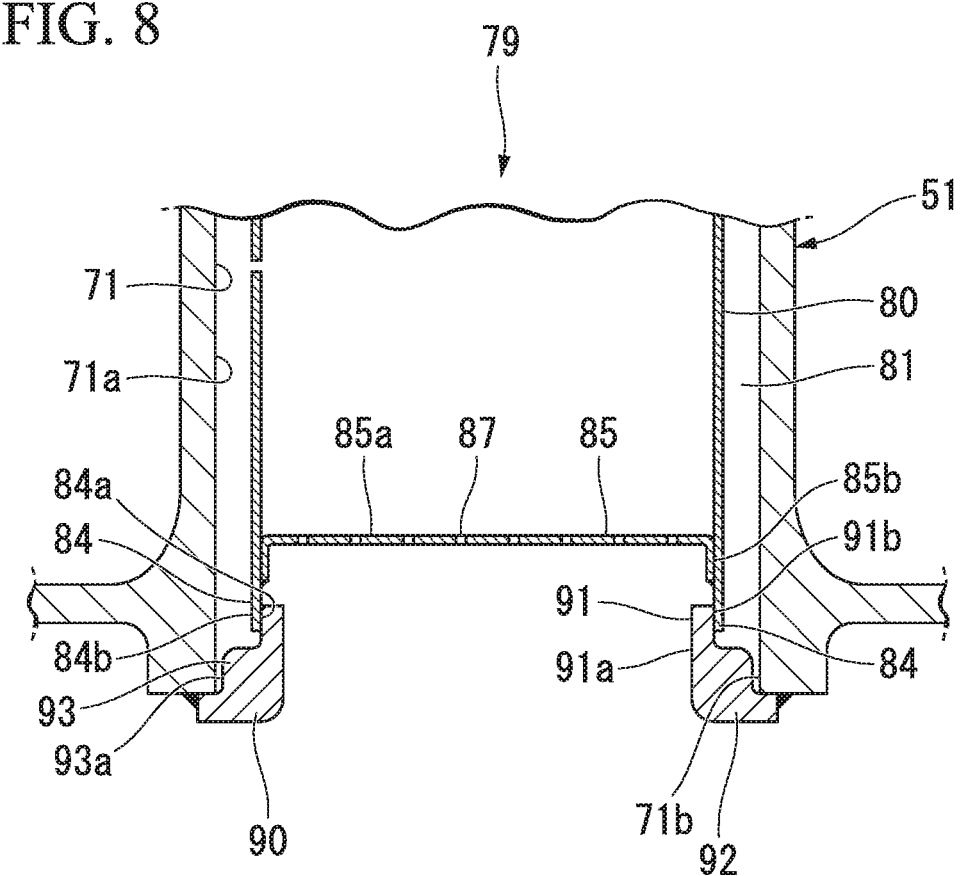
FIG. 8 is a sectional view of a rim of an opening of an airfoil air passage in a third embodiment of the present invention.
Figure 8:
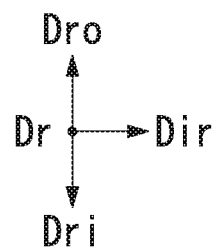

As shown in FIG. 8, the shape and the structure of the retaining member 90 are substantially the same as those in the first embodiment. The leading end of the positioning part 91 of the retaining member 90 on the radially outer side Dro is fitted on the inner circumferential surface 84a of the end 84 of the insert 80. Thus, the inner circumferential surface 84a of the end 84 of the insert 80 and the outer circumferential surface 91b of the positioning part 91 come in contact with each other, and a sealing interface is formed therebetween. This structure is also the same as in the first embodiment. Although this is not shown, in the case of the third embodiment, an outer flange is formed at the end 88 of the insert 80 on the radially outer side Dro as in the first embodiment. This outer flange is fixed by welding etc. to the end edge of the airfoil body 51. Thus, the insert 80 thermally expands so as to extend toward the radially inner side Dri, and this thermal elongation of the insert 80 is absorbed as it slides at the sealing interface in the radial direction Dr. This structure is also the same as in the first embodiment. As with the second embodiment, the third embodiment may also be a structure in which the outer circumferential surface 84b of the end 84 of the insert 80 and the inner circumferential surface 91a of the positioning part 91 come in contact with each other and a sealing interface is formed therebetween.

Except that the reinforcing member 85 is a flow regulating plate having the large number of vent holes 87 and that the cover plate 94 is not provided over the opening 71b of the airfoil air passage 71 on the radially inner side Dri, the configuration is the same as in the first embodiment. The same components as in the first embodiment will be denoted by the same name and the same reference sign to omit detailed description thereof.

The reinforcing member 85 intended to adjust the flow rate is provided near the end 84 on the radially inner side Dri of the airfoil body 51. Thus, it is possible to adjust the amount of cooling air discharged through the impingement holes 82, as well as to enhance the rigidity of the insert 80 on the radially inner side Dri. Therefore, also in the third embodiment, the reinforcing member 85 has an effect of preventing expansion of the gap at the sealing interface formed between the inner circumferential surface 84a of the end 84 and the outer circumferential surface 91b of the positioning part 91. In other words, the reinforcing member 85 has an effect of preventing expansion of the gap at the sealing interface due to the influence of the difference in pressure between the inner cavity 80b and the insert cavity 81 and the difference in thermal elongation between the insert 80 and the retaining member 90.

Specifically, the reinforcing member 85 disposed near the end 84, adjacently to and on the radially outer side Dro of the end 84, prevents the insert 80 from expanding outward in the insert radial direction Dir. This has an effect of suppressing an increase in the loss of the cooling air Ac incurred as the cooling air Ac leaks out to the insert cavity 81 through the sealing interface between the positioning part 91 of the retaining member 90 and the end 84 of the insert 80.

Although this is not shown, in the third embodiment, the reinforcing member 85 that has a flow regulating plate and is intended to adjust the flow rate may be provided in the opening 71c of the airfoil air passage 71 on the radially outer side Dro (on the side of the outer shroud 60o).

Modified Example

A modified example of the insert of the third embodiment will be described with reference to FIG. 9.

The insert 80 in the first embodiment to the third embodiment is provided with the reinforcing member 85 near the end 84 of the insert 80 on the radially inner side Dri, for example, adjacently to and on the radially outer side Dro of the end 84. The reinforcing member 85 is disposed so as to cover the entire area of the passage cross-section of the inner cavity 80b of the insert 80. The insert 80 in this modified example has the same structure as in the other embodiments in that a reinforcing member 86 is provided near the end 84 of the insert 80 on the radially inner side Dri. However, the structure of the reinforcing member 86 is different from that in the other embodiments in that the reinforcing member 86 does not cover the entire area of the passage cross-section of the inner cavity 80b but is provided only at a part of the passage cross-section.

Figure 9:
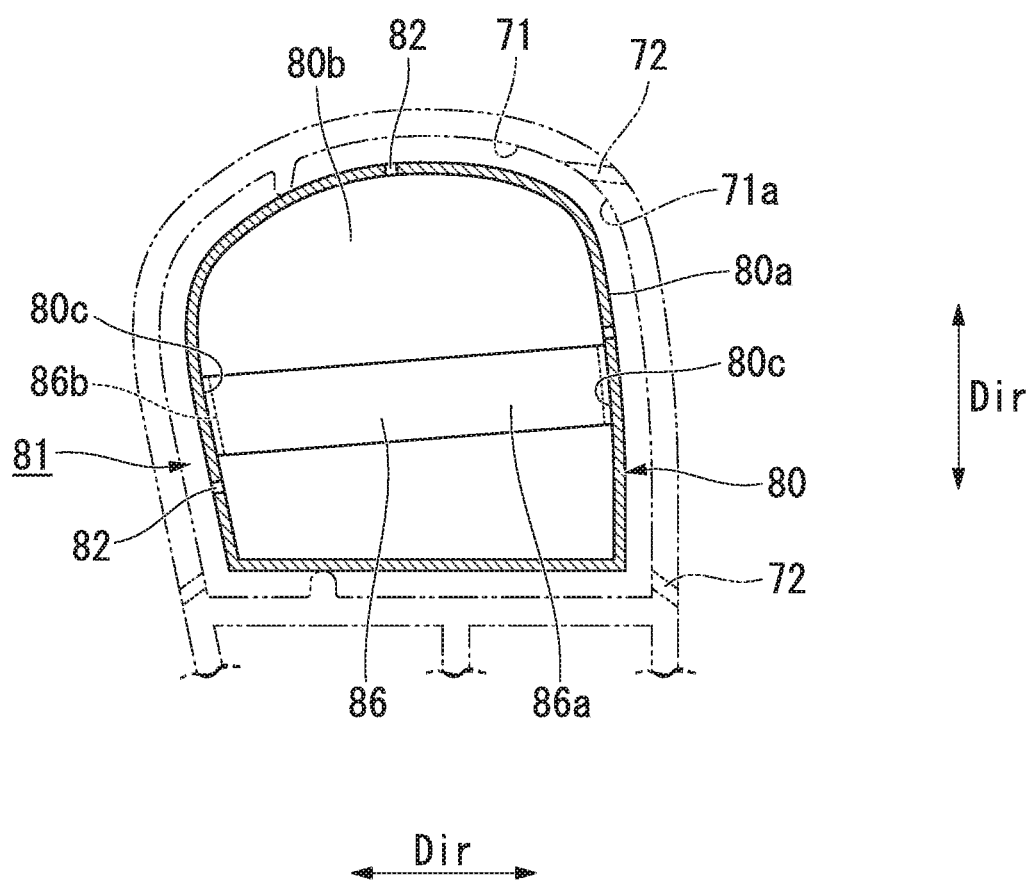
FIG. 9 is a sectional view of a modified example of the rim of the opening of the airfoil air passage in the third embodiment of the present invention.

As shown in FIG. 9, the reinforcing member 86 is disposed between the two inner circumferential surfaces 80c of the insert 80 facing each other in the insert radial direction Dir of the insert 80. As in the other embodiments, end edges of the reinforcing member 86 in a longitudinal direction are bent at a right angle toward the radially inner side Dri to form mount portions 86b. The mount portions 86b are fixed by welding etc. to the inner circumferential surfaces 80c of the inert 80. No vent hole is formed in a main body 86a of the reinforcing member 86 of this modified example.

In this modified example, the end 88 of the insert 80 on the side of the outer shroud 60o is fixed by welding etc. to the end edge of the airfoil body 51 on the radially outer side Dro. The retaining member 90 is fixed by welding etc. to the end edge of the airfoil body 51 on the side of the inner shroud 60i. A sealing interface is formed between the end 84 of the insert 80 and the retaining member 90. A difference in thermal elongation of the insert 80 in the radial direction Dr is absorbed as the insert 80 slides at the sealing interface in the radial direction Dr. Alternatively, the end of the insert 80 may be fixed to the airfoil body 51 on the side of the inner shroud 60i. In this structure, the retaining member 90 is disposed on the side of the outer shroud 60o. Moreover, in this structure, the sealing interface at which the insert 80 and the retaining member 90 come in contact with each other is disposed near the opening 71c of the airfoil air passage 71 on the radially outer side Dro.

The other components are the same as in the third embodiment, and therefore the same components will be denoted by the same name and the same reference sign to omit detailed description thereof. For a section of the radially inner side Dri of the insert 80 of this modified example as seen from the insert radial direction Dir, the sectional view of the third embodiment (FIG. 8) shown in FIG. 8, with the reinforcing member 85 replaced with the reinforcing member 86, can be referred to.

According to the structure shown in this modified example, the reinforcing member 86 is provided near the end 84 of the insert 80 on the radially inner side Dri, for example, adjacently to and on the radially outer side Dro of the end 84. Thus, the rigidity of the insert 80 near the end 84 on the radially inner side Dri is enhanced. As a result, it is possible to suppress an increase in the amount of loss of the cooling air Ac incurred as part of the cooling air Ac supplied to the airfoil air passage 71 leaks to the insert cavity 81 through the sealing interface between the end 84 of the insert 80 and the positioning part 91 of the retaining member 90.

The insert 80 shown in this modified example can also be applied to the first embodiment and the second embodiment. In this case, a space on the radially inner side Dri from the reinforcing member 86 also constitutes part of the inner cavity 80b, and the dust housing space 100 is not formed. Applying the reinforcing member 86 shown in this modified example to the first embodiment and the second embodiment can enhance the rigidity of the insert 80 near the end 84. It is therefore possible to suppress leakage of part of the cooling air Ac inside the inner cavity 80b to the insert cavity 81 through the sealing interface between the end 84 of the insert 80 and the retaining members 90, 110.

The airfoils of the above embodiments and modified example have the insert assemblies described above, so that the rigidity of the insert 80 near the end 84 of the insert 80 can be enhanced by the reinforcing members 85, 86. Moreover, it is possible to suppress leakage of the cooling air Ac to the insert cavity 81 through the sealing interface between the end 84 of the insert 80 and the retaining members 90, 110 that constitute parts of the insert assembly 79. Furthermore, the cooling performance of the airfoil can be improved.

The gas turbine of the above embodiments includes the airfoil described above, and therefore the cooling performance of the airfoil can be improved and the merchantability of the gas turbine can be improved.

The airfoil manufacturing method of the embodiments and the modified example allows the insert 80 to be disposed at its correct position relative to the airfoil air passage 71 by a simple procedure. Thus, airfoil assembly does not require skillfulness, and burden on assembly workers can be relieved.

The present invention is not limited to the above embodiments, but includes these embodiments with various modifications added thereto within the scope of the gist of the invention. Thus, the specific shapes, configurations, etc. presented in the embodiments are merely examples and can be modified as appropriate.

INDUSTRIAL APPLICABILITY

The insert assembly of the present invention can stably maintain excellent sealing performance, and can thereby suppress a decrease in thermal efficiency of the gas turbine. Moreover, the insert assembly of the present invention allows easy assembly and can secure stable cooling performance of the airfoil.

REFERENCE SIGNS LIST

10 Gas turbine
11 Gas turbine rotor
15 Gas turbine casing
20 Compressor
21 Compressor rotor
22 Rotor shaft
23 Rotor blade stage
23a Rotor blades
25 Compressor casing
26 Stator vane stage
26a Stator vane
30 Combustor
40 Turbine
41 Turbine rotor
42 Rotor shaft
42p Cooling air passage
43 Rotor blade stage
43a Rotor blade
45 Turbine casing
45a Outer casing
45b Inner casing
45c Ring segment
45p Cooling air passage
46 Stator vane stage
46a Stator vane
49 Combustion gas flow passage
51 Airfoil body
52 Leading edge 53 Trailing edge
54 Suction-side surface
55 Pressure-side surface
60*i* Inner shroud
60*o* Outer shroud
64 Gas path surface
65 Peripheral wall
66 Recess
71 Airfoil air passage
71*a* Inner circumferential surface (inner wall surface)
71*b*, 71*c* Opening
72 Airfoil surface blow-out passage
79 Insert assembly
80 Insert
80*a* Outer circumferential surface
80*b* Inner cavity
80*c* Inner circumferential surface
81 Insert cavity
82 Impingement hole (cooling hole)
83 Seal dam
84, 88 End
84*a* Inner circumferential surface
84*b* Outer circumferential surface
85, 86 Reinforcing member
85*a* Main body
85*b* Mount portion
86*b* Mount portion
87 Vent hole (through-hole)
90, 110 Retaining member
91, 111 Positioning part
91*a*, 111*a* Inner circumferential surface
91*b*, 111*b* Outer circumferential surface
92, 112 Flange
92*a* Side surface
93, 113 Positioning protrusion
93*a*, 113*a* Side surface
94 Cover plate
100 Housing space
A Air
Ac Cooling air
Ar Axis
Da Axial direction
Dad Downstream side
Dau Upstream side
Dc Circumferential direction
Dr Radial direction
Dri Radially inner side
Dro Radially outer side
Dir Insert radial direction
G Combustion gas
GEN Generator
w1 Welded joint
w2 Welded joint

The invention claimed is:

1. An insert assembly that is disposed inside a turbine airfoil composed of an airfoil body and an outer shroud and an inner shroud formed respectively at both ends of the airfoil body in a radial direction, and that is provided inside an airfoil air passage through which cooling air is supplied into the airfoil body, the insert assembly comprising:
   an insert that is formed as a cylindrical body having a plurality of cooling holes and is fixed to an end of the airfoil body on one side in the radial direction;
   a plate-shaped reinforcing member that is provided inside the insert, extends in a direction orthogonal to the radial direction, is fixed at both ends to an inner circumferential surface of the cylindrical body, and is disposed adjacent to an end of the cylindrical body on the other side in the radial direction; and
   an annular retaining member that is fixed to an end of the airfoil body on the other side in the radial direction, comes in contact with an end of the insert so as to form a sealing interface on which the insert is slidable in the radial direction, and allows the insert to be positioned relative to the airfoil body in a direction orthogonal to the radial direction.

2. The insert assembly according to claim 1, wherein the sealing interface is formed on an inner circumferential surface of the end of the insert.

3. The insert assembly according to claim 1, wherein the sealing interface is formed on an outer circumferential surface of the end of the insert.

4. The insert assembly according to claim 1, wherein
   the retaining member has an L-sectional shape that is tapered toward the one end in the radial direction, and the retaining member includes:
      an annular positioning part that is formed at a leading end on a side of the one end in the radial direction;
      a positioning protrusion that is provided adjacent to the positioning part, on a side of the other end in the radial direction, and has a larger diameter than the positioning part; and
      a flange that is provided adjacent to the positioning protrusion, on the side of the other end in the radial direction, has a larger diameter than the positioning protrusion, and is fixed to the airfoil body.

5. The insert assembly according to claim 4, wherein the positioning part is fitted in the radial direction on the end of the insert.

6. The insert assembly according to claim 4, wherein the positioning protrusion has a side surface thereof fitted in an opening of the airfoil air passage on the side of the one end.

7. The insert assembly according to claim 1, wherein the reinforcing member is formed so as to cover the entire area of a passage cross-section of an inner cavity surrounded by the insert.

8. The insert assembly according to claim 1, wherein the reinforcing member has at least one through-hole.

9. The insert assembly according to claim 8, further comprising a cover plate that closes an opening provided at the other end of the airfoil body.

10. The insert assembly according to claim 9, wherein
   the through-hole formed in the reinforcing member is a vent hole through which dust accumulating in a space inside the insert is removed,
   the insert has a dust housing space surrounded by the reinforcing member and the cover plate, and
   the retaining member is formed so as to be fittable in the insert with the sealing interface therebetween.

11. The insert assembly according to claim 9, wherein the cover plate is fixed to the retaining member and the retaining member is integrated with the cover plate.

12. An airfoil comprising the insert assembly according to claim 1.

13. A gas turbine comprising the airfoil according to claim 12.

14. An airfoil manufacturing method comprising the steps of:
   forming an insert that is insertable into an airfoil air passage that is formed so as to extend from an outer shroud to an inner shroud of an airfoil;
   fixing a reinforcing member to an inner circumferential surface of the insert so as to integrate the reinforcing member with the insert;

forming a retaining member that allows a first end of the insert to be positioned relative to the vane air passage;

fixing a flange of the retaining member to a rim of a first opening of the vane air passage;

inserting the insert into the vane air passage through a second opening located on the opposite side from the first opening in which the retaining member is mounted, and positioning the first end of the insert by the retaining member; and fixing a second end of the insert to a rim of the second opening of the vane air passage.

\* \* \* \* \*